United States Patent
Ober et al.

(10) Patent No.: US 9,934,092 B2
(45) Date of Patent: Apr. 3, 2018

(54) MANIPULATING A DISTRIBUTED AGREEMENT PROTOCOL TO IDENTIFY A DESIRED SET OF STORAGE UNITS

(71) Applicant: International Business Machines Corporation, Armonk, NY (US)

(72) Inventors: Brian F. Ober, Lake in the Hills, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 15/208,505

(22) Filed: Jul. 12, 2016

(65) Prior Publication Data

US 2018/0018225 A1     Jan. 18, 2018

(51) Int. Cl.
- *G06F 12/00* (2006.01)
- *G06F 11/10* (2006.01)
- *G06F 3/06* (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
CPC .... G06F 11/1076; G06F 3/0619; G06F 3/064; G06F 3/067
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Gurtej Bansal
(74) *Attorney, Agent, or Firm* — Garlick & Markison; Timothy W. Markison

(57) ABSTRACT

A method includes obtaining, by a computing device, a plurality of sets of encoded data slices for storage in memory of a dispersed storage network (DSN). The method further includes identifying, by the computing device, a desired set of storage units within pools of storage units for storing the plurality of sets of encoded data slices. The method further includes generating, by the computing device, a specific source name based on the desired set of storage units and a distributed agreement protocol (DAP). The method further includes generating, by the computing device, a plurality of sets of slices names that includes the specific source name. The method further includes sending, by the computing device, a plurality of sets of write requests to the desired set of storage units regarding the plurality of sets of encoded data slices and in accordance with the plurality of sets of slice names.

20 Claims, 8 Drawing Sheets

(56) References Cited

U.S. PATENT DOCUMENTS

| | | |
|---|---|---|
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbell et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Hung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

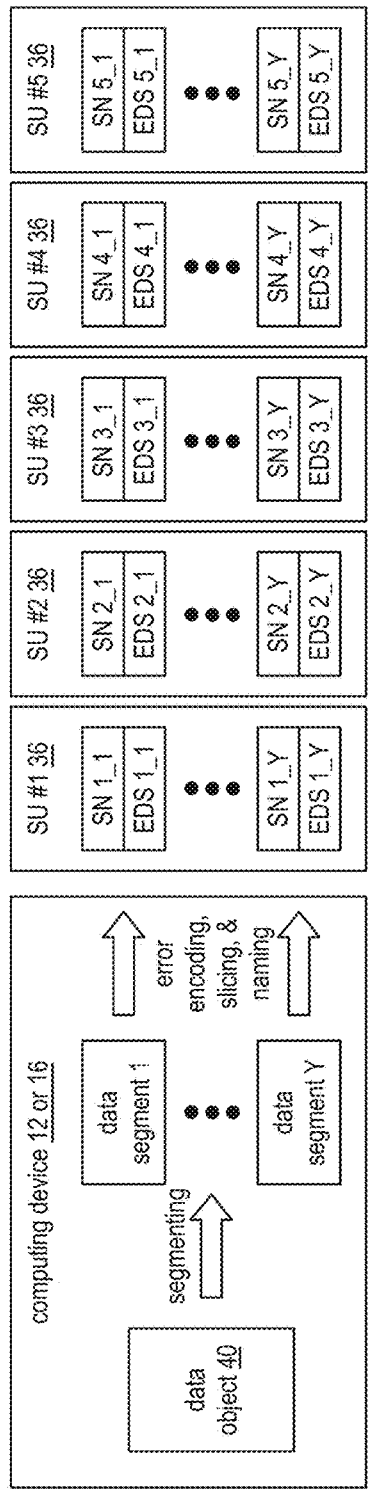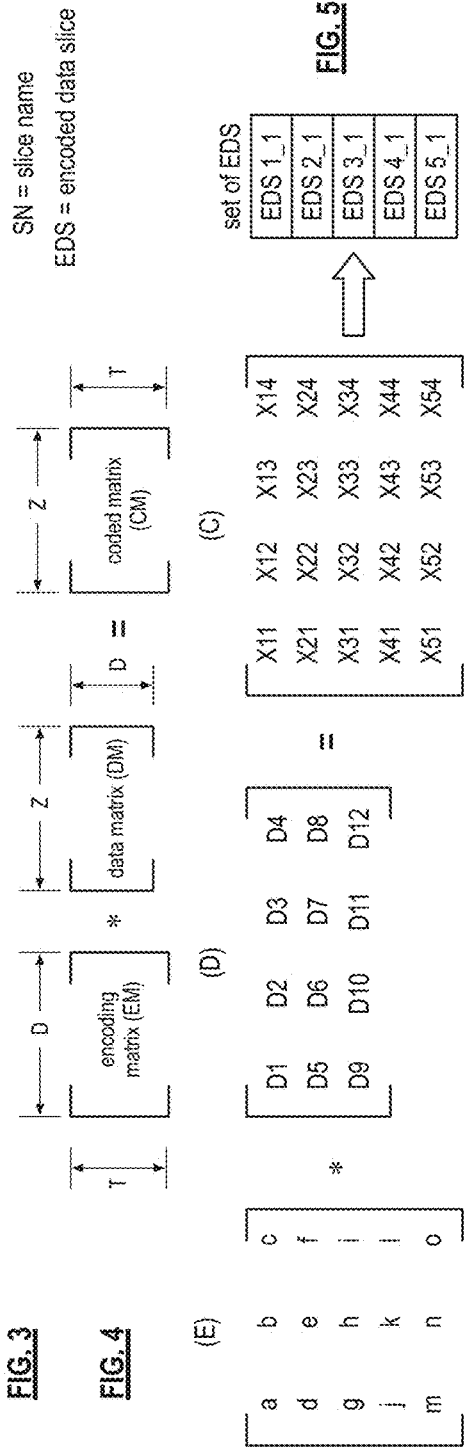

MANIPULATING A DISTRIBUTED AGREEMENT PROTOCOL TO IDENTIFY A DESIRED SET OF STORAGE UNITS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

In a dispersed storage system that includes pluralities of storage units, there are instances where it is more efficient, faster, and/or more reliable for a computing device to write to a specific set of storage units rather than to other sets of storage units. In dispersed storage systems that utilize a load-capacity balancing storage protocol, selection of specific sets of storage units is typically not permitted. Thus, a computing device is assigned a set of storage units to write to, which may not be the most efficient, fastest, or most reliable for the computing device.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
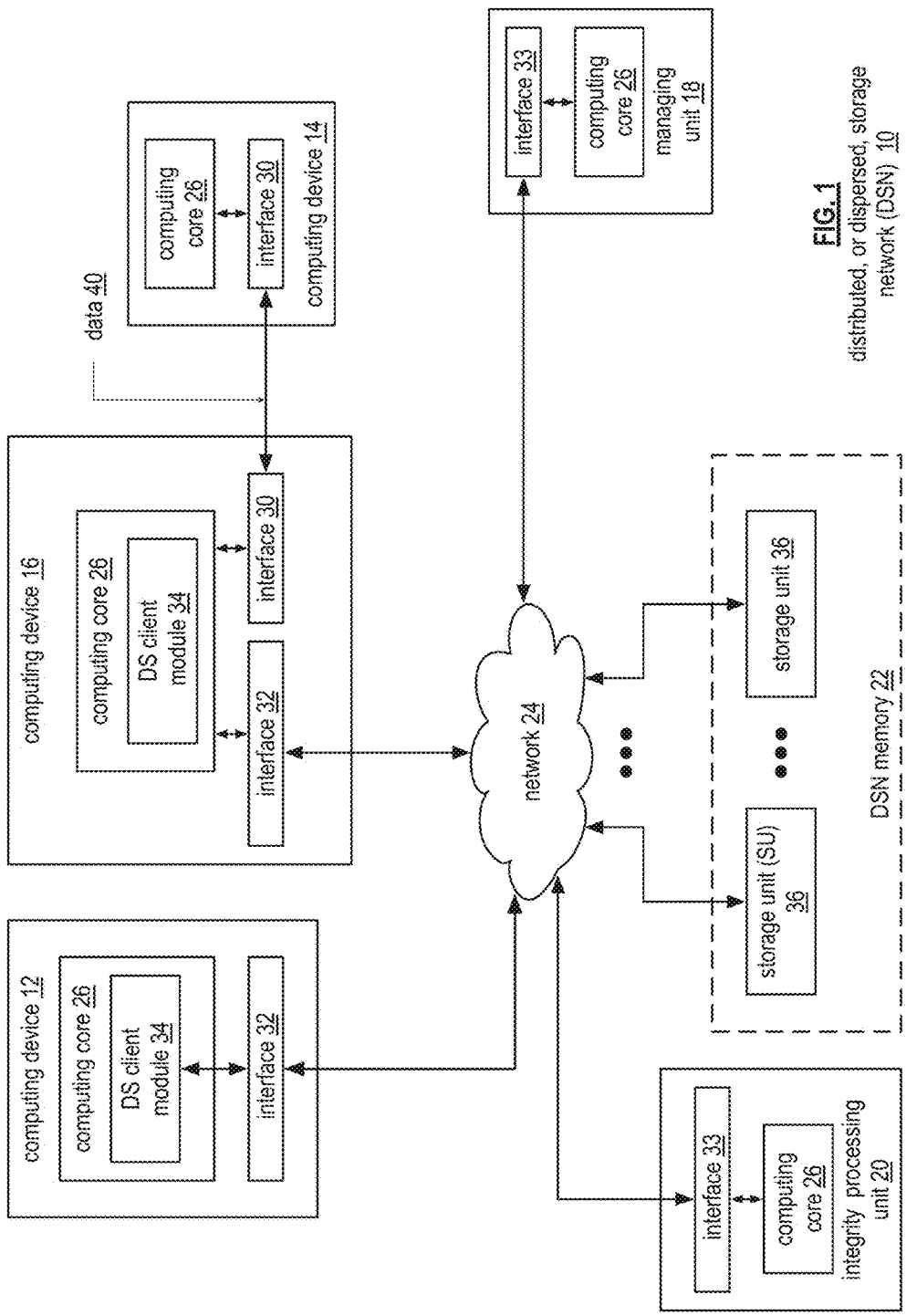
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
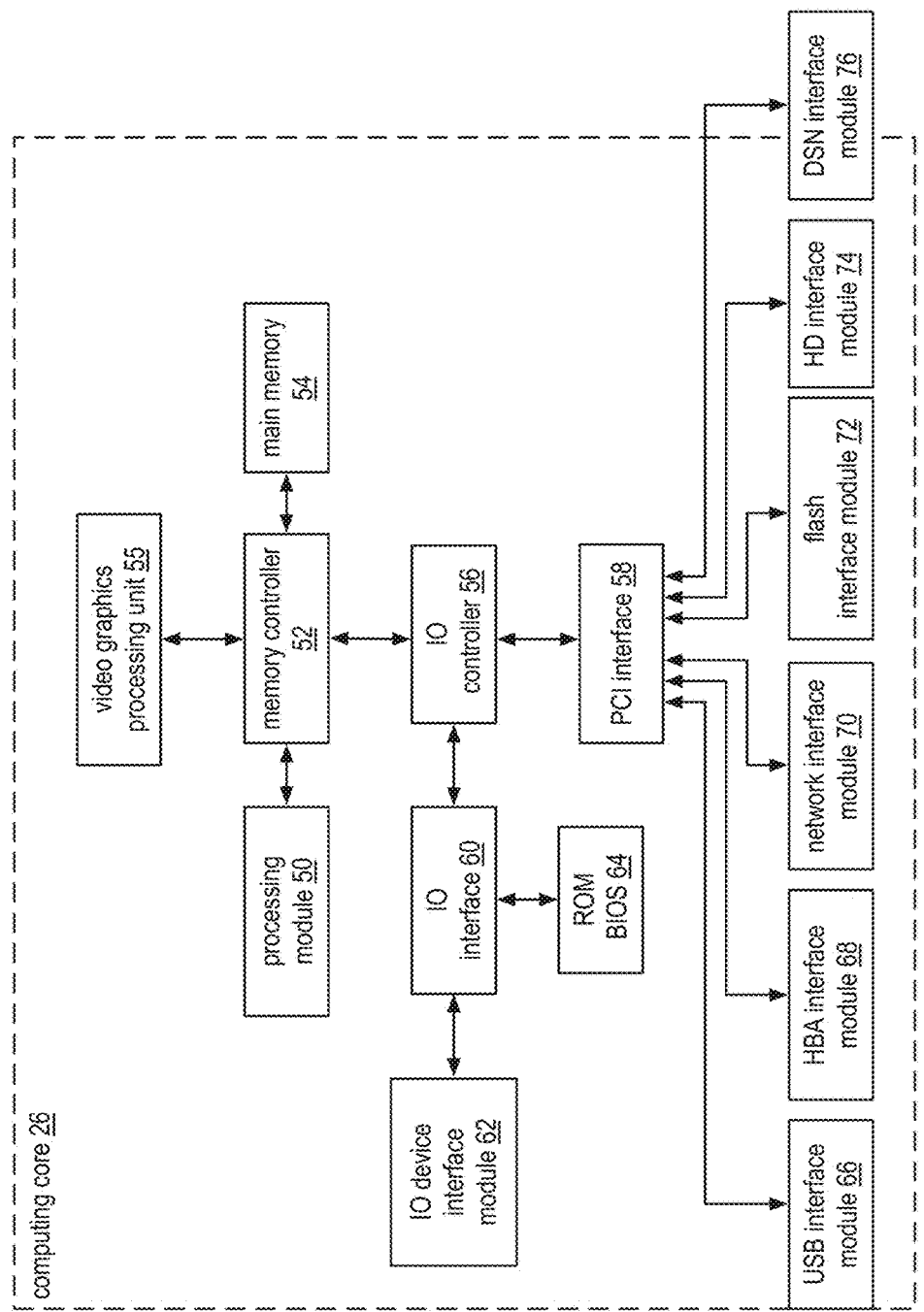
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 78 is shown in FIG. 6. As shown, the slice name (SN) 78 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
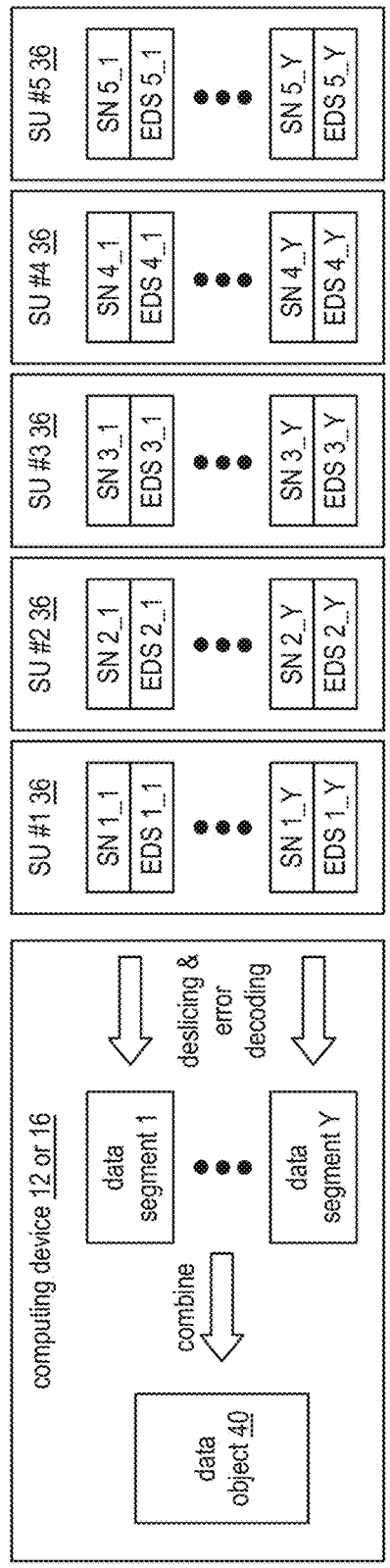
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
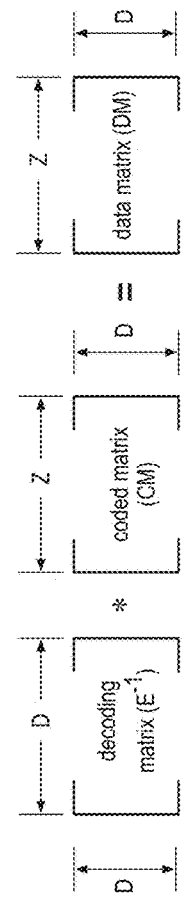
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
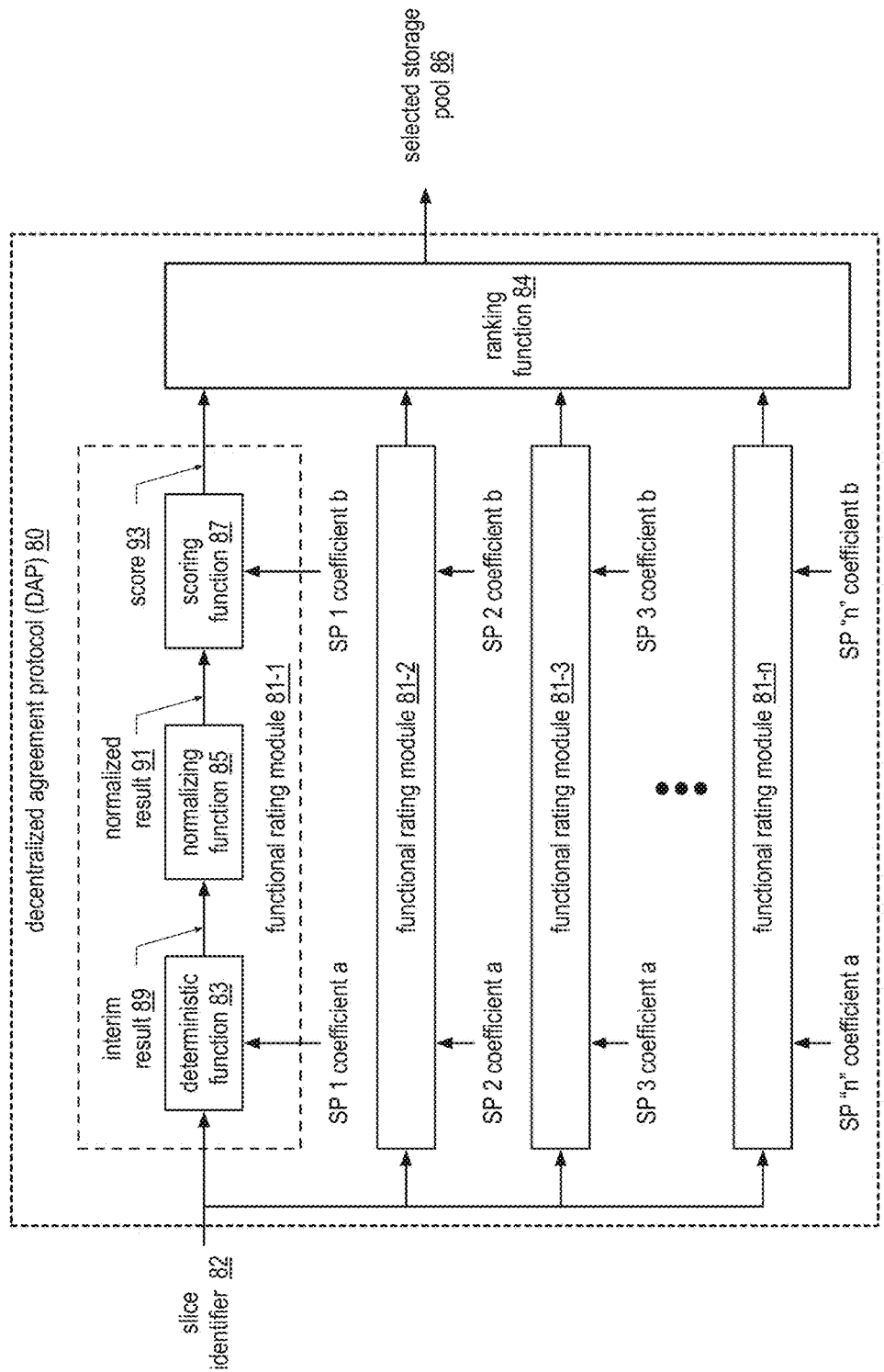
FIG. 9 is a schematic block diagram of an embodiment of decentralized, or distributed, agreement protocol (DAP) in accordance with the present invention.

FIG. 9 is a schematic block diagram of an embodiment of a decentralized, or distributed, agreement protocol (DAP) 80 that may be implemented by a computing device, a storage unit, and/or any other device or unit of the DSN to determine where to store encoded data slices or where to find stored encoded data slices. The DAP 80 includes a plurality of functional rating modules 81. Each of the functional rating modules 81 includes a deterministic function 83, a normalizing function 85, and a scoring function 87.

Each functional rating module 81 receives, as inputs, a slice identifier 82 and storage pool (SP) coefficients (e.g., a first functional rating module 81-1 receives SP 1 coefficients "a" and b). Based on the inputs, where the SP coefficients are different for each functional rating module 81, each functional rating module 81 generates a unique score 93 (e.g., an alpha-numerical value, a numerical value, etc.). The ranking function 84 receives the unique scores 93 and orders them based on an ordering function (e.g., highest to lowest, lowest to highest, alphabetical, etc.) and then selects one as a selected storage pool 86. Note that a storage pool includes one or more sets of storage units. Further note that the slice identifier 82 corresponds to a slice name or common attributes of set of slices names. For example, for a set of encoded data slices, the slice identifier 82 specifies a data segment number, a vault ID, and a data object ID, but leaves open ended, the pillar number. As another example, the slice identifier 82 specifies a range of slice names (e.g., 0000 0000 to FFFF FFFF).

As a specific example, the first functional rating module 81-1 receives the slice identifier 82 and SP coefficients for storage pool 1 of the DSN. The SP coefficients includes a first coefficient (e.g., "a") and a second coefficient (e.g., "b"). For example, the first coefficient is a unique identifier for the corresponding storage pool (e.g., SP #1's ID for SP 1 coefficient "a") and the second coefficient is a weighting factor for the storage pool. The weighting factors are derived to ensure, over time, data is stored in the storage pools in a fair and distributed manner based on the capabilities of the storage units within the storage pools.

For example, the weighting factor includes an arbitrary bias which adjusts a proportion of selections to an associated location such that a probability that a source name will be mapped to that location is equal to the location weight divided by a sum of all location weights for all locations of comparison (e.g., locations correspond to storage units). As a specific example, each storage pool is associated with a location weight factor based on storage capacity such that, storage pools with more storage capacity have a higher location weighting factor than storage pools with less storage capacity.

The deterministic function 83, which may be a hashing function, a hash-based message authentication code function, a mask generating function, a cyclic redundancy code function, hashing module of a number of locations, consistent hashing, rendezvous hashing, and/or a sponge function, performs a deterministic function on a combination and/or concatenation (e.g., add, append, interleave) of the slice identifier 82 and the first SP coefficient (e.g., SU 1 coefficient "a") to produce an interim result 89.

The normalizing function 85 normalizes the interim result 89 to produce a normalized interim result 91. For instance, the normalizing function 85 divides the interim result 89 by a number of possible output permutations of the deterministic function 83 to produce the normalized interim result. For example, if the interim result is 4,325 (decimal) and the number of possible output permutations is 10,000, then the normalized result is 0.4325.

The scoring function 87 performs a mathematical function on the normalized result 91 to produce the score 93. The mathematical function may be division, multiplication, addition, subtraction, a combination thereof, and/or any mathematical operation. For example, the scoring function divides the second SP coefficient (e.g., SP 1 coefficient "b") by the negative log of the normalized result (e.g., $e^y=x$ and/or $\ln(x)=y$). For example, if the second SP coefficient is 17.5 and the negative log of the normalized result is 1.5411 (e.g., $e^{(0.4235)}$), the score is 11.3555.

The ranking function 84 receives the scores 93 from each of the function rating modules 81 and orders them to produce a ranking of the storage pools. For example, if the ordering is highest to lowest and there are five storage units in the DSN, the ranking function evaluates the scores for five storage units to place them in a ranked order. From the ranking, the ranking module 84 selects one the storage pools 86, which is the target for a set of encoded data slices.

The DAP 80 may further be used to identify a set of storage units, an individual storage unit, and/or a memory device within the storage unit. To achieve different output results, the coefficients are changed according to the desired location information. The DAP 80 may also output the ranked ordering of the scores.

Figure 10:
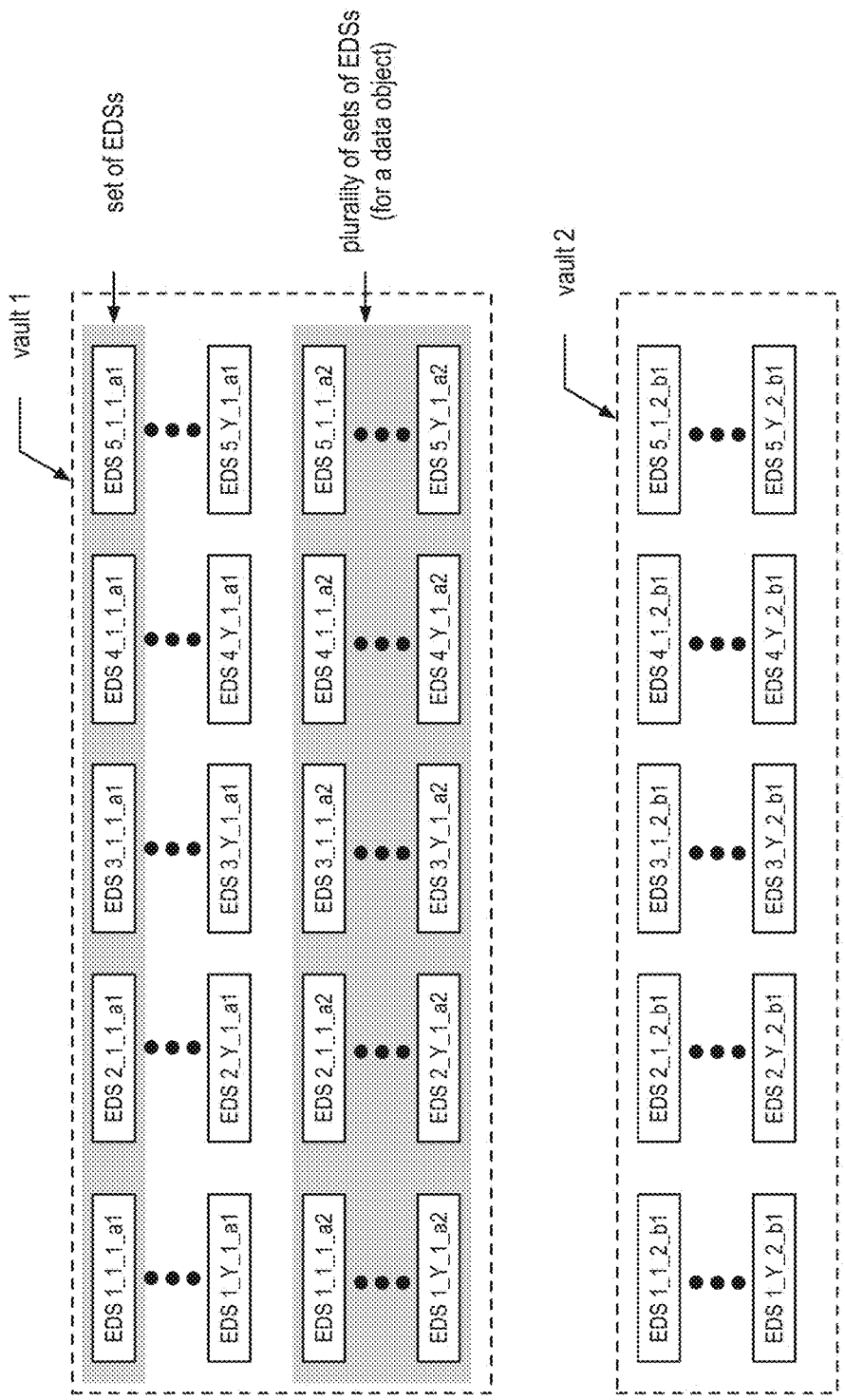
FIG. 10 is a schematic block diagram of an example of creating pluralities of sets of slices in accordance with the present invention.

FIG. 10 is a schematic block diagram of an example of creating pluralities of sets of slices. Each plurality of sets of encoded data slices (EDSs) corresponds to the encoding of a data object, a portion of a data object, or multiple data object, where a data object is one or more of a file, text, data, digital information, etc. For example, the highlighted plurality of encoded data slices corresponds to a data object having a data identifier of "a2".

Each encoded data slices of each set of encoded data slices is uniquely identified by its slice name, which is also used as at least part of the DSN address for storing the encoded data slice. As shown, a set of EDSs includes EDS 1_1_1_a1 through EDS 5_1_1_a1. The EDS number includes pillar number, data segment number, vault ID, and data object ID. Thus, for EDS 1_1_1_a1, it is the first EDS of a first data segment of data object "a1" and is to be stored, or is stored, in vault 1. Note that vaults are a logical memory container supported by the storage units of the DSN. A vault may be allocated to one or more user computing devices.

As is further shown, another plurality of sets of encoded data slices are stored in vault 2 for data object "b1". There are Y sets of EDSs, where Y corresponds to the number of data segments created by segmenting the data object. The last set of EDSs of data object "b1" includes EDS 1_Y_2_b1 through EDS 5_Y_2_b1. Thus, for EDS 1_Y_2_b1, it is the first EDS of the last data segment "Y" of data object "b1" and is to be stored, or is stored, in vault 2.

Figure 11:
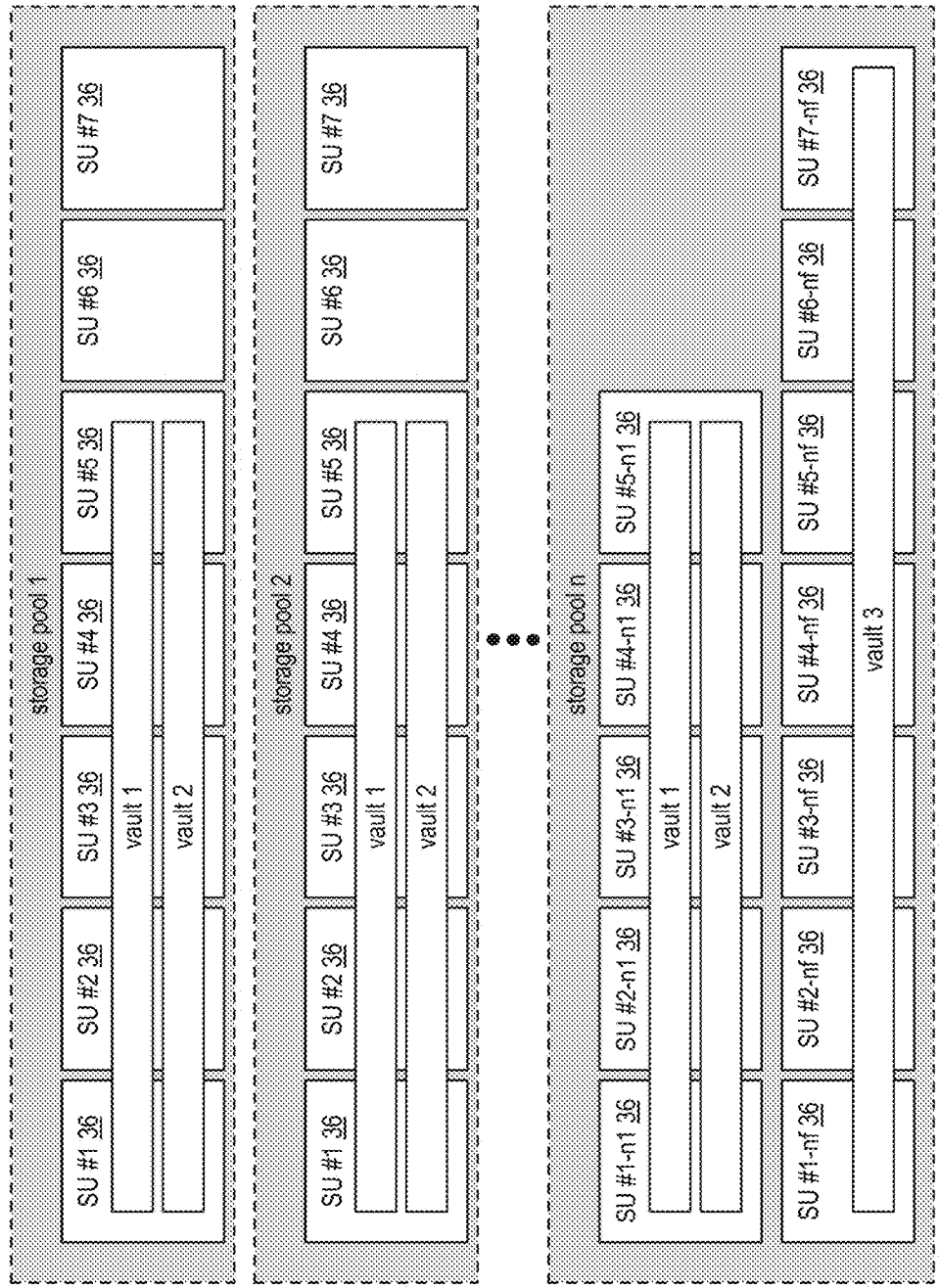
FIG. 11 is a schematic block diagram of an example of storage vaults in accordance with the present invention.

FIG. 11 is a schematic block diagram of an example of a plurality of storage pools (e.g., pool 1 through pool n) that support one or more storage vaults. Each storage pool (e.g., 1 through n) includes one or more sets of storage units, where the number of storage units in a set of storage unit corresponds to the pillar width number of sets of encoded data slices it stores. For instance, storage pool 1 and storage pool 2 each include seven storage units and storage pool n includes twelve storage units. Note that a storage pool can have more or less storage units than illustrated and, from storage pool to storage pool, may have different numbers of storage units.

In this example, the storage pools 1 through n support three vaults (vault 1, vault 2 and vault 3). Vaults 1 and 2 use five of the storage units and span multiple storage pools. Vault 3 uses seven of the storage units and is only in storage pool "n". The number of storage units within a vault corresponds to the pillar width number, which is five for vaults 1 and 2 and seven for vault 3 in this example. Note that a storage pool may have rows of storage units, where SU #1 represents a group of storage units, each corresponding to a first pillar number; SU #2 represents a second plurality of storage units, each corresponding to a second pillar number; and so on. For example, the box labeled storage unit SU #1 of storage pool 1 is representative of a plurality of storage units.

Each device (e.g., computing devices 12-16, managing unit 18, integrity processing unit 20, storage unit) of the DSN may include the distributed agreement protocol 80 as shown in FIG. 9. The DAP 80 uses slice identifiers (e.g., the slice name and/or one or more common elements thereof (e.g., the pillar number, the data segment number, the vault ID, and/or the data object ID)) to identify, for one or more sets of encoded data slices, a set, or pool, of storage units. With respect to the three pluralities of sets of encoded data slices (EDSs) of FIG. 11, the DAP 80 approximately equally distributes the sets of encoded data slices throughout the DSN memory (e.g., among the various storage units).

A computing device may target a set of storage units to store its encoded data slices because, from the computing devices' perspective, it can write more efficiently, reliably, and/or faster to the targeted set of storage units than a set assigned via the DAP. As described in greater detail with reference to FIG. 12, the computing device can manipulate the DAP such that the DAP assigns it the desired set of storage units. To do this, the computing device creates a specific slice identifier (e.g., a specific source name) instead of one that includes one or more randomly generated components (e.g., data object ID).

Over time, if many computing devices manipulate the DAP to get its desired set of storage units, a storage imbalance will likely occur. The storage imbalance (e.g., DAP imbalance) can be corrected, at least to some degree, by the storage units. For example, the storage unit initiate a change to the DAP coefficients (e.g., storage mapping coefficients), which will cause some of the encoded data slices stored in the computing devices' desired sets of storage units to other storage units. This will be discussed in greater detail with reference to FIG. 12.

Figure 12:
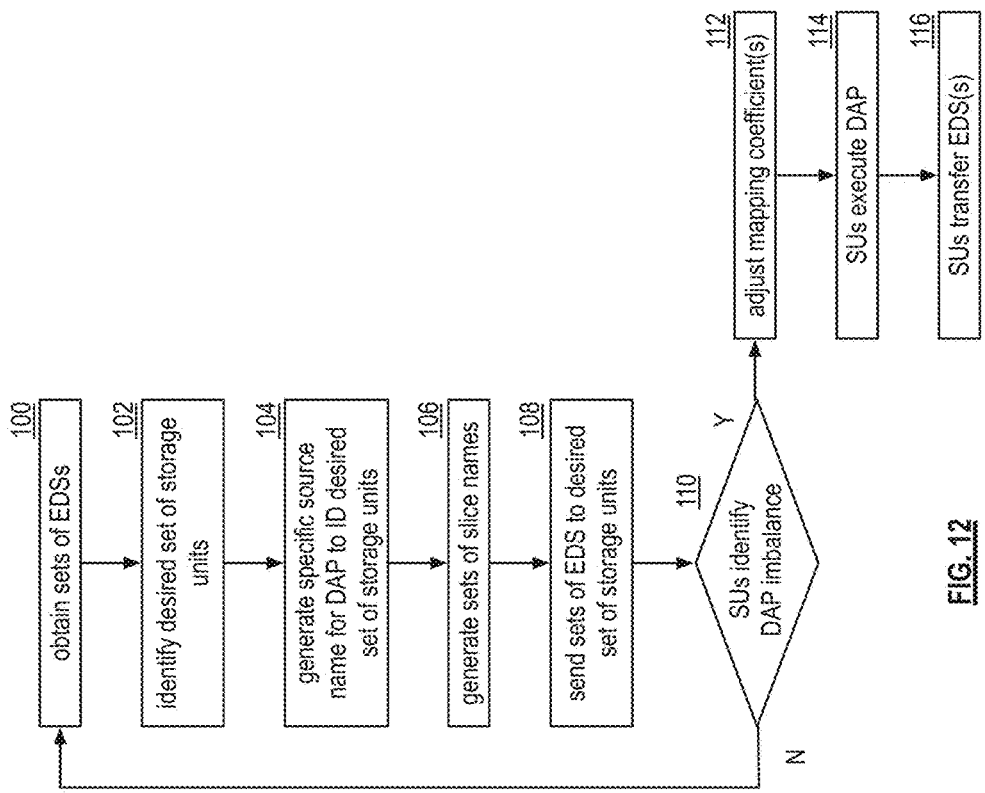
FIG. 12 is a logic diagram of an example of a method of manipulating a DAP to identify a desired set of storage units in accordance with the present invention.

FIG. 12 is a logic diagram of an example of a method of manipulating a distributed agreement protocol (DAP) to identify a desired set of storage units. The method begins at step 100 where a computing device of a dispersed storage network, obtains (e.g., receives, creates, etc.) a plurality of sets of encoded data slices for storage in memory of the DSN (e.g., the DSN memory includes a plurality of pools of storage units (e.g., a pool includes one or more sets of storage units) located throughout a geographic area).

The method continues at step 102 where the computing device identifies a desired set of storage units within the plurality of pools of storage units for storing the plurality of sets of encoded data slices. For example, the computing device identifies the desired set of storage units within the plurality of pools of storage units having a desired writing speed (e.g., data rate and latency of writing that is better than a DAP identified set of storage units). As another example, the computing device identifies the desired set of storage units as a set having a desired efficiency (e.g., meeting and exceeding a write threshold in a timely manner for a majority of the sets of encoded data slices being stored). As yet another example, the computing device identifies the desired set of storage units as the set having a desired reliability (e.g., consistency of having at least a write threshold number of storage units available for storing encoded data slices).

The manner in which the computing device identifies the desired set of storage units may be done in a variety of ways. For example, the computing device executes a lookup function (e.g., executing a lookup function to identify the set). As another example, the computing devices initiates a query that tests desired write speed, desired efficiency, and/or desired reliability and receiving a response thereto. As a further example, the computing device accessing a historical record, which tracks the computing device's write speed, efficiency, and/or reliability data when writing to sets of storage units of the DSN. From the historical record, the computing device selects the set of store units having the desired writing traits (e.g., desired write speed, desired efficiency, and/or desired reliability). As a still further example, the computing device accesses a look up table to identify the set.

The method continues at step 104 where the computing device generates a specific source name (e.g., a specific data object ID combined with a vault ID) for the DAP to identify a desired set of storage units. For example, the computing device generates a specific data object ID based on the DAP so that the DAP identifies the desired set storage units of the plurality of pools of storage units. The computing device generates the specific source name by generating a specific data object identifier and combining it with a vault identifier and/or revision level information. Within the DSN, devices (e.g., the computing device, other computing devices, the storage units, managing unit, integrity unit, etc.) use the specific source name as the slice identifier when executing the DAP to identify the desired set of storage units as the storage units storing the plurality of sets of encoded data slices.

The method continues at step 106 where the computing device generates a plurality of sets of slices names for the plurality of sets of encoded data slices. The computing device generates a slice name by combining the specific source name with a pillar number and a data segment number. The method continues at step 108 where the computing device sends, in accordance with the plurality of sets of slice names, a plurality of sets of write requests to the desired set of storage units regarding the plurality of sets of encoded data slices.

The method continues at step 110 where the storage units of the DSN determine whether there is a DAP imbalance. When the storage units determine there is not a DAP, the method loops back to step 100.

When there is a DAP imbalance, the method continues at step 112 where the storage units initiate an adjustment of the mapping coefficients. For example, one of the storage units adjusts the storage mapping coefficients. As another example, a storage unit requests that the managing unit adjust the storage mapping coefficients. The storage unit or managing until adjusts the storage mapping coefficients (e.g., coefficient b for one or more functional rating modules of FIG. 9) such that one or more encoded data slices are transferred from storage units of the desired set of storage units to other storage units in the DSN.

The method continues at step 114 where the storage units execute the DAP using the specific source name and the adjusted storage mapping coefficients to identify one or more encoded data slices to be transferred to one or more other storage units. The method continues at step 116 where the storage units of the desired set of storage units transfer the one or more encoded data slices to the one or more other storage units.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   obtaining, by a computing device of a dispersed storage network (DSN), a plurality of sets of encoded data slices for storage in memory of the DSN, wherein the memory of the DSN includes a plurality of pools of storage units located throughout a geographic area, wherein a data object is divided into a plurality of data segments, and wherein the plurality of data segments is dispersed storage error encoded into the plurality of sets of encoded data slices;
   identifying, by the computing device, a desired set of storage units within the plurality of pools of storage units for storing the plurality of sets of encoded data slices;
   generating, by the computing device, a specific source name based on the desired set of storage units and a distributed agreement protocol (DAP), wherein the DAP identifies a set storage units of the plurality of pools of storage units based on a slice identifier and a plurality of storage mapping coefficients and wherein, when a device within the DSN executes the DAP, the device utilizes the specific source name as the slice identifier to identify the desired set of storage units;
   generating, by the computing device, a plurality of sets of slices names for the plurality of sets of encoded data slices, wherein the plurality of sets of slices names include the specific source name; and
   sending, by the computing device, a plurality of sets of write requests to the desired set of storage units regarding the plurality of sets of encoded data slices and in accordance with the plurality of sets of slice names.

2. The method of claim 1, wherein the generating the specific source name comprises:
   generating a specific data object identifier; and
   combining the specific data object identifier with one or more of a vault identifier and revision level information to produce the specific source name.

3. The method of claim 1, wherein generating a slice name of the plurality of sets of slices names comprises:
   combining the specific source name with a pillar number and a data segment number to produce the slice name.

4. The method of claim 1, where the DAP comprises:
   a plurality of functions operable to generate one or more unique scores based on a plurality of storage pool coefficients and one or more slice identifiers corresponding to the plurality of sets of encoded data slices; and
   a ranking function that processes the one or more unique scores to identify a selected storage pool to store the plurality of sets of encoded data slices.

5. The method of claim 1 further comprises:
   determining, by at least some storage units of the plurality of pools of storage units, a DAP imbalance resulting from computing devices creating source names having specific data object identifiers instead of randomly generating data object identifiers;
   adjusting, by the at least some storage units, one or more storage mapping coefficients of the plurality of storage mapping coefficients to produce an adjusted plurality of storage mapping coefficients;
   executing, by the at least some storage units, the DAP using the specific source name and the adjusted plurality of storage mapping coefficients to identify one or more encoded data slices of the plurality of sets of encoded data slices to be transferred to one or more other storage units within the plurality of pools of storage units; and
   transferring, by one or more storage units of the desired set of storage units, the one or more encoded data slices to the one or more other storage units.

6. The method of claim 1, wherein the identifying the desired set of storage units comprises one or more of:
   identifying a set of storage units within the plurality of pools of storage units having a desired writing speed with respect to the computing device;
   identifying the set of storage units within the plurality of pools of storage units having a desired efficiency with respect to the computing device; and
   identifying the set of storage units within the plurality of pools of storage units having a desired reliability with respect to the computing device.

7. The method of claim 6, wherein the identifying the desired set of storage units comprises one or more of:
   executing a lookup;
   initiating a query;
   receiving a query response;
   accessing a historical record;
   accessing a table; and
   receiving a desired set of storage units list.

8. A computer readable memory device comprises:
   a first memory element that stores operational instructions that, when executed by a computing device of a dispersed storage network (DSN), causes the computing device to:
      obtain a plurality of sets of encoded data slices for storage in memory of the DSN, wherein the memory of the DSN includes a plurality of pools of storage units located throughout a geographic area, wherein a data object is divided into a plurality of data segments, and wherein the plurality of data segments is dispersed storage error encoded into the plurality of sets of encoded data slices; and
      identify a desired set of storage units within the plurality of pools of storage units for storing the plurality of sets of encoded data slices;

a second memory element that stores operational instructions that, when executed by the computing device, causes the computing device to:
  generate a specific source name based on the desired set of storage units and a distributed agreement protocol (DAP), wherein the DAP identifies a set storage units of the plurality of pools of storage units based on a slice identifier and a plurality of storage mapping coefficients and wherein, when a device within the DSN executes the DAP, the device utilizes the specific source name as the slice identifier to identify the desired set of storage units; and
  generate a plurality of sets of slices names for the plurality of sets of encoded data slices, wherein the plurality of sets of slices names include the specific source name; and
a third memory element that stores operational instructions that, when executed by the computing device, causes the computing device to:
  send a plurality of sets of write requests to the desired set of storage units regarding the plurality of sets of encoded data slices and in accordance with the plurality of sets of slice names.

9. The computer readable memory device of claim 8, wherein the second memory element further stores operational instructions that, when executed by the computing device, causes the computing device to generate the specific source name by:
  generating a specific data object identifier; and
  combining the specific data object identifier with one or more of a vault identifier and revision level information to produce the specific source name.

10. The computer readable memory device of claim 8, wherein the second memory element further stores operational instructions that, when executed by the computing device, causes the computing device to generate a slice name of the plurality of sets of slices names by:
  combining the specific source name with a pillar number and a data segment number to produce the slice name.

11. The computer readable memory device of claim 8, the second memory element that stores operational instructions that, when executed by the computing device, causes the computing device to utilize the DAP by performing:
  a plurality of functions operable to generate one or more unique scores based on a plurality of storage pool coefficients and one or more slice identifiers corresponding to the plurality of sets of encoded data slices; and
  a ranking function that processes the one or more unique scores to identify a selected storage pool to store the plurality of sets of encoded data slices.

12. The computer readable memory device of claim 8 further comprises:
  a fourth memory element that stores operational instructions that, when executed by each of at least some storage units of the plurality of pools of storage units, causes the at least some storage units to:
    determine a DAP imbalance resulting from computing devices creating source names having specific data object identifiers instead of randomly generating data object identifiers;
    adjust one or more storage mapping coefficients of the plurality of storage mapping coefficients to produce an adjusted plurality of storage mapping coefficients;
  a fifth memory element that stores operational instructions that, when executed by the at least some storage units, causes the at least some storage units to:
    execute the DAP using the specific source name and the adjusted plurality of storage mapping coefficients to identify one or more encoded data slices of the plurality of sets of encoded data slices to be transferred to one or more other storage units within the plurality of pools of storage units; and
    transfer, by one or more storage units of the desired set of storage units, the one or more encoded data slices to the one or more other storage units of the at least some storage units.

13. The computer readable memory device of claim 8, wherein the first memory element further stores operational instructions that, when executed by the computing device, causes the computing device to identify the desired set of storage units by one or more of:
  identifying a set of storage units within the plurality of pools of storage units having a desired writing speed with respect to the computing device;
  identifying the set of storage units within the plurality of pools of storage units having a desired efficiency with respect to the computing device; and
  identifying the set of storage units within the plurality of pools of storage units having a desired reliability with respect to the computing device.

14. The computer readable memory device of claim 13, wherein the first memory element further stores operational instructions that, when executed by the computing device, causes the computing device to identify the desired set of storage units by one or more of:
  executing a lookup;
  initiating a query;
  receiving a query response;
  accessing a historical record;
  accessing a table; and
  receiving a desired set of storage units list.

15. A computing device of a dispersed storage network (DSN), wherein the computing device comprises:
  interface;
  memory; and
  a processing module operably coupled to the memory and the interface, wherein the processing module is operable to:
    obtain a plurality of sets of encoded data slices for storage in memory of the DSN, wherein the memory of the DSN includes a plurality of pools of storage units located throughout a geographic area, wherein a data object is divided into a plurality of data segments, and wherein the plurality of data segments is dispersed storage error encoded into the plurality of sets of encoded data slices;
    identify a desired set of storage units within the plurality of pools of storage units for storing the plurality of sets of encoded data slices;
    generate a specific source name based on the desired set of storage units and a distributed agreement protocol (DAP), wherein the DAP identifies a set storage units of the plurality of pools of storage units based on a slice identifier and a plurality of storage mapping coefficients and wherein, when a device within the DSN executes the DAP, the device utilizes the specific source name as the slice identifier to identify the desired set of storage units;
    generate a plurality of sets of slices names for the plurality of sets of encoded data slices, wherein the plurality of sets of slices names include the specific source name; and send a plurality of sets of write requests to the desired set of storage units regarding the plurality of sets of encoded data slices and in accordance with the plurality of sets of slice names.

16. The computing device of claim 15, wherein the processing module is further operable to generate the specific source name by:
    generating a specific data object identifier; and
    combining the specific data object identifier with one or more of a vault identifier and revision level information to produce the specific source name.

17. The computing device of claim 15, wherein the processing module is further operable to generate a slice name of the plurality of sets of slices names by:
    combining the specific source name with a pillar number and a data segment number to produce the slice name.

18. The computing device of claim 15, wherein the processing module is further operable to utilize the DAP by performing:
    a plurality of functions operable to generate one or more unique scores based on a plurality of storage pool coefficients and one or more slice identifiers corresponding to the plurality of sets of encoded data slices; and
    a ranking function that processes the one or more unique scores to identify a selected storage pool to store the plurality of sets of encoded data slices.

19. The computing device of claim 15, wherein the processing module is further operable to identify the desired set of storage units by one or more of:
    identifying a set of storage units within the plurality of pools of storage units having a desired writing speed with respect to the computing device;
    identifying the set of storage units within the plurality of pools of storage units having a desired efficiency with respect to the computing device; and
    identifying the set of storage units within the plurality of pools of storage units having a desired reliability with respect to the computing device.

20. The computing device of claim 19, wherein the processing module is further operable to identify the desired set of storage units by one or more of:
    executing a lookup;
    initiating a query;
    receiving a query response;
    accessing a historical record;
    accessing a table; and
    receiving a desired set of storage units list.

* * * * *